(12) United States Patent
Byun

(10) Patent No.: US 6,288,690 B1
(45) Date of Patent: *Sep. 11, 2001

(54) VIDEO CONTROL CIRCUIT FOR A VIDEO DISPLAY DEVICE

(75) Inventor: Ho Jin Byun, Suwon (KR)

(73) Assignee: SamSung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/961,885

(22) Filed: Oct. 31, 1997

(30) Foreign Application Priority Data

Oct. 31, 1996 (KR) .................................. 96-51418

(51) Int. Cl.$^7$ ...................................... G09G 1/06
(52) U.S. Cl. ............... 345/10; 345/11; 345/20; 345/22; 315/383; 348/687; 348/379; 348/471; 348/707
(58) Field of Search ............... 345/10, 148, 11, 345/20, 22; 348/687, 688, 689, 678, 679, 377, 379, 707, 712, 471, 474, 455, 673, 805, 686, 719; 315/383

(56) References Cited

U.S. PATENT DOCUMENTS

| | | | |
|---|---|---|---|
| 3,775,637 | * 11/1973 | Brady | 315/22 |
| 4,213,144 | 7/1980 | de Boer | 358/12 |
| 4,340,908 | * 7/1982 | Wakabayashi et al. | 358/194.1 |
| 4,651,064 | * 3/1987 | Parker et al. | 315/383 |
| 4,945,403 | 7/1990 | Kubo et al. | 358/13 |
| 5,107,189 | 4/1992 | Page | 315/383 |
| 5,317,400 | * 5/1994 | Gurley et al. | 348/679 |
| 5,341,131 | * 8/1994 | Hoshino et al. | 340/825.21 |
| 5,359,266 | 10/1994 | Smith et al. | 315/383 |
| 5,367,231 | 11/1994 | Kobayashi et al. | 315/383 |
| 5,386,247 | 1/1995 | Shafer et al. | 348/687 |
| 5,432,566 | 7/1995 | Tanaka et al. | 348/687 |
| 5,604,404 | * 2/1997 | Sahara | 315/8 |
| 5,604,918 | * 2/1997 | Huijsing et al. | 395/892 |
| 5,644,367 | * 7/1997 | Yu | 348/656 |

\* cited by examiner

*Primary Examiner*—Bipin Shalwala
*Assistant Examiner*—Jimmy H. Nguyen
(74) *Attorney, Agent, or Firm*—Robert E. Bushnell, Esq

(57) ABSTRACT

A video control circuit controls the gains for red(R), green (G), and blue(B) color video signals inputted to a monitor, the brightness and contrast of a video display on the monitor, and the bias of a cathode ray tube within the monitor. A microcomputer outputs, in an I$^2$C manner, data for a control signal for controlling contrast, brightness, gain and/or bias. The data are inputted to an I$^2$C data process/PWM signal generation section which converts the data to PWM signal outputs. Rectification sections rectify the PWM signal outputs to provide contrast, brightness, gain and cutoff voltage signals. Only two output terminals of the microcomputer are employed for outputting a clock signal and the data for the control signal so as to control contrast, brightness, gain and bias control signals according to output signals of the variable resistors VR11 and VR12 and a bias/grain control section. A clock signal is generated by the microcomputer in synchronization with the data DATA. The I$^2$C data process/PWM signal generation section generates the PWM signal outputs for contrast, brightness, bias and gain control according to the data received from the microcomputer. Rectification sections generate the contrast, brightness, bias and cutoff voltage signals, respectively, by rectifying the PWM signal output from the I$^2$C data process/PWM signal generation section.

14 Claims, 2 Drawing Sheets

VIDEO CONTROL CIRCUIT FOR A VIDEO DISPLAY DEVICE

CLAIM OF PRIORITY

This application makes reference to, incorporates the same herein, and claims all benefits accruing under 35 U.S.C. §119 from an application for VIDEO CONTROL CIRCUIT FOR A VIDEO DISPLAY DEVICE earlier filed in the Korean Industrial Property Office on the Oct. 31, 1996, and there duly assigned Serial No. 51418/1996.

BACKGROUND OF THE INVENTION

1. Technical Field

The present invention relates to a video display process and device such as a monitor for a computer system, and, more particularly, to a video control circuit for a video display device for controlling gains of red(R), green(G), and blue(B) color video signals, brightness and contrast for a video display, and bias of a color video signal.

2. Related Art

In general, a monitor controls a white balance by varying gains of R, G, and B color video signals inputted from a computer system, and controls contrast to distinctly show light and dark sides of a video display.

Further, a cathode ray tube which is used for a monitor requires a specific range of brightness values. A cutoff voltage of the cathode ray tube is determined according to biases of R, G, and B color video signals which are displayed on the cathode ray tube, and brightness varies when a bias voltage occurs based on the determined cutoff voltage according to control of the brightness.

Exemplars of designs in the art include those shown by U.S. Pat. No. 5,432,566 to Tanaka et al., entitled Video Circuit Controlling Brightness And/Or Saturation, U.S. Pat. No. 5,386,247 to Shafer et al., entitled Video Display Having Progressively Dimmed Video Images And Constant Brightness Auxiliary Images, U.S. Pat. No. 5,367,231 to Kobayashi et al., entitled Display System, U.S. Patent No. 5,359,266 to Smith et al, entitled System For Generating Triggering Pulses For Use In Beam Indexing Type Color Cathode Ray Tubes, U.S. Pat. No. 5,107,189 to Page, entitled RGB Video Amplifier System Integrating Blanking And Brightness Control Tracking, U.S. Pat. No. 4,945,403 to Kubo et al., entitled Color Television Format Using Pulse Frequency And Pulse Width Modulation, and U.S. Pat. No. 4,213,144 to de Boer, entitled Method Of Modulating A Composite Color Television Signal On A Carrier Signal And Device For Carrying Out Said Method.

Typically, these video control circuits have control sections, each controlling gains of the R, G and B color video signals, the brightness, the contrast and bias. As discussed in more detail below however, such a conventional video control circuit must have a microcomputer which is quite expensive in nature, and which specifically has enough output terminals to control the gains of the R, G and B color video signals, the brightness, the contrast and the bias. This results in an increase in the production cost of such a microcomputer, as well as complication in the design of the printed circuit board on which the microcomputer is disposed.

SUMMARY OF THE INVENTION

Accordingly, it is an object of the present invention to provide an improved video control process and circuit.

It is another object to provide a video control circuit for a video display device for using less number of output terminals of a microcomputer in outputting control signals when controlling contrast, brightness, gain and bias.

To attain the above object, the video control circuit for a video display device according to the present invention has a microcomputer output which provides, in an inter interface control($I^2C$) manner, control signals for controlling the contrast, brightness, gain and/or bias.

Data of the control signals outputted in the $I^2C$ manner by the microcomputer are inputted to an $I^2C$ data process/pulse width modulation(PWM) signal generation section so as to output in PWM form a contrast control signal, brightness control signal, gain control signal and bias control signal. The outputted PWM signal is rectified through a rectification section in order that the contrast control signal, brightness control signal, gain control signal and/or bias control signal be outputted.

Therefore, according to the present invention, only two output terminals of the microcomputer are occupied for outputting, in the $I^2C$ manner, a clock signal and a data signal of the contrast control signal, brightness control signal, gain control signal and/or bias control signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
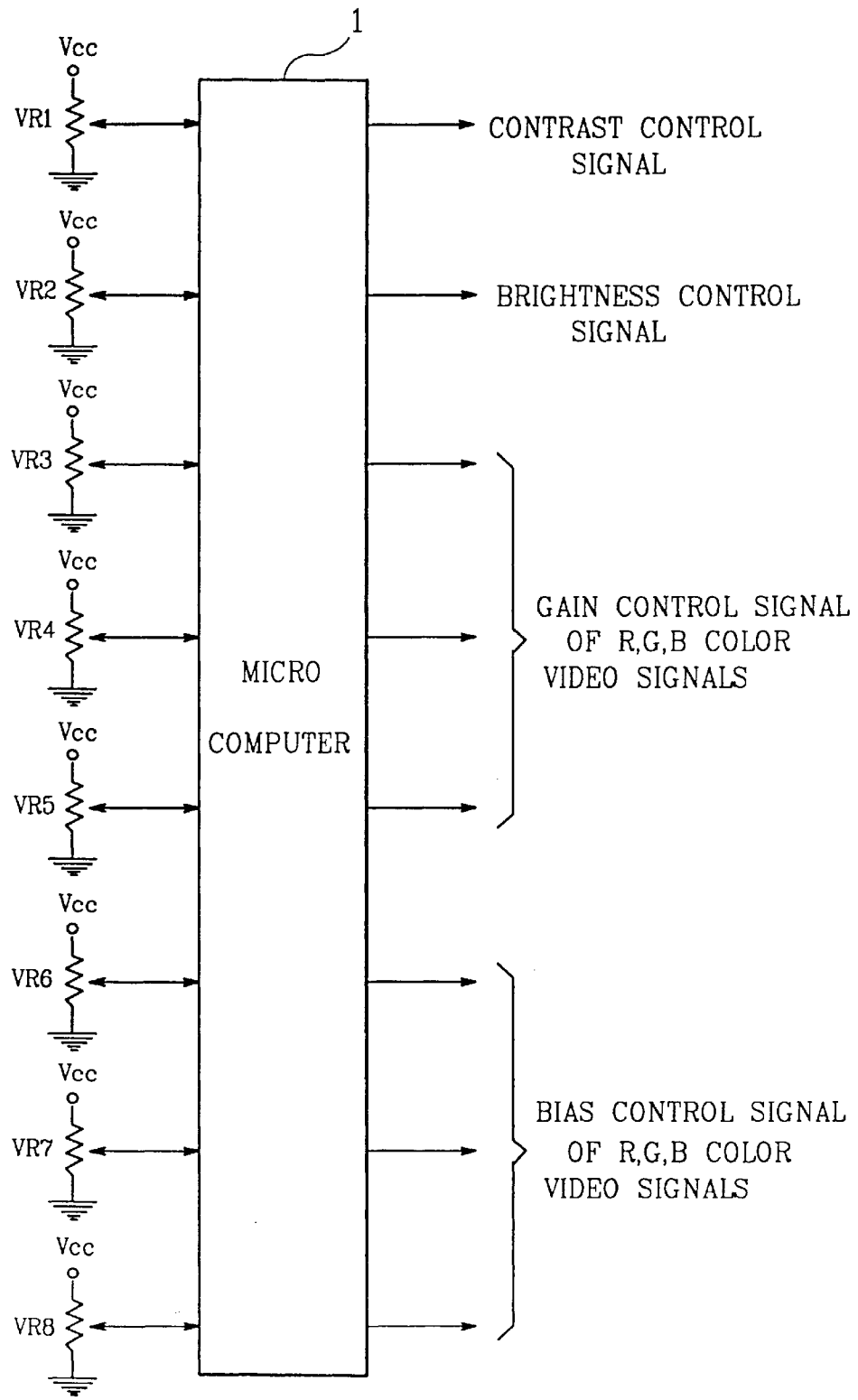
FIG. 1 is a view schematically showing a video control circuit for a video display device.

As shown in FIG. 1, a conventional video control circuit is provided with a variable resistor VR1 for controlling the contrast, a variable resistor VR2 for controlling the brightness, three variable resistors VR3, VR4, and VR5 for controlling the gains of the R, G, and B color video signals, respectively, and three variable resistors VR6, VR7, and VR8 for controlling the biases of the R, G, and B color video signals, respectively.

Each of the variable resistors VR1–VR8 is connected to each of the input terminals of a microcomputer 1. The microcomputer 1 outputs a contrast control signal, a brightness control signal, color video signal gain control signals, and color video signal bias control signals according to variations of the variable resistors VR1–VR8. Reference numeral Vcc in FIG. 1 denotes a power supply voltage. Such a conventional video control circuit must employ eight output terminals from the microcomputer 1 for achieving the contrast control, brightness control, gain control, and bias control but the microcomputer 1 has limited output terminals. Therefore, an expansive microcomputer 1 having enough output terminals must be used, but this increases the production cost and complicates the design of a printed circuit board because of the increase in the number of lines for achieving contrast control, brightness control, gain control and bias control.

Hereinafter, a video control circuit according to an embodiment of the present invention will be described in detail with reference to the accompanying drawings of FIGS. 2 and 3.

Figure 2:
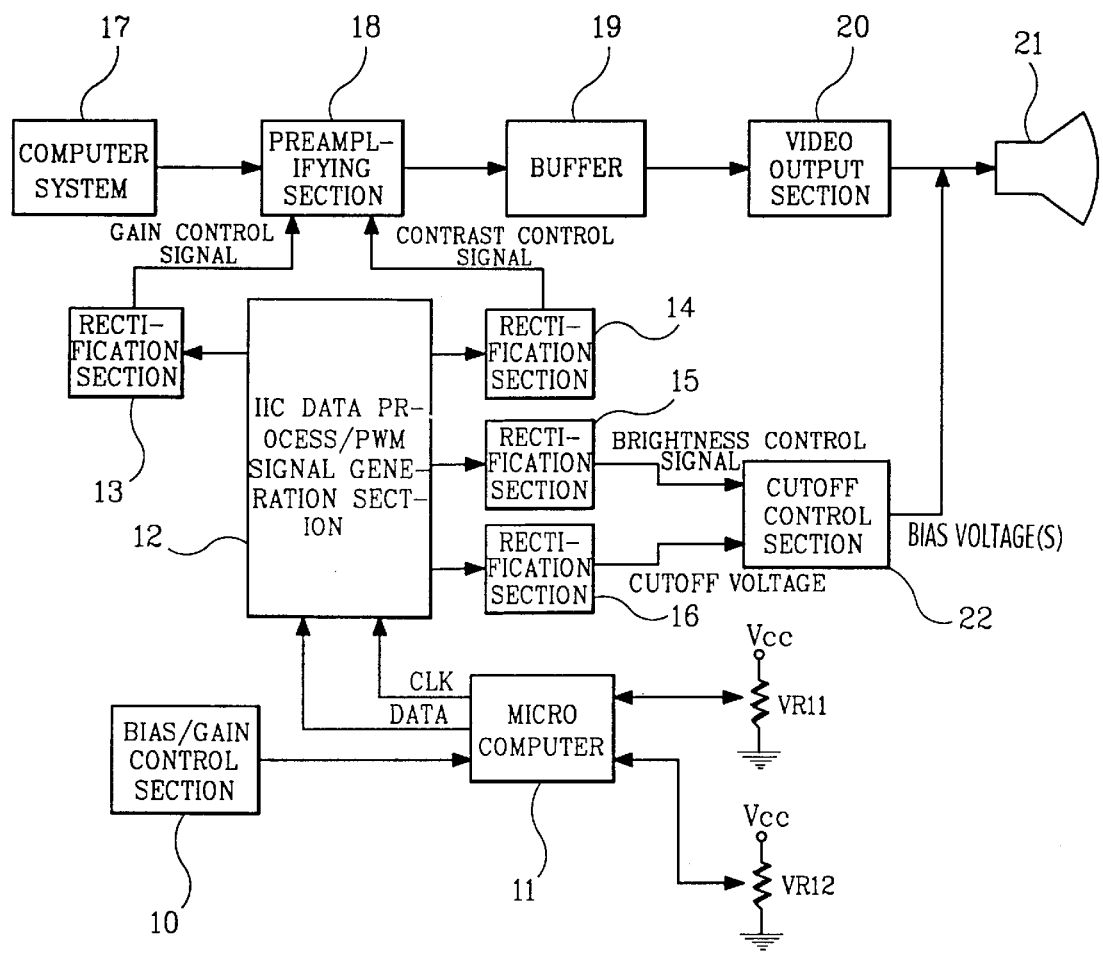
FIG. 2 is a view showing a video control circuit for a video display device, constructed as an embodiment of the present invention.

FIG. 2 is a view showing a video control circuit for a video display device according to an embodiment of the present invention. As shown in FIG. 2, the video control circuit comprises: a variable resistor VR11 for controlling contrast; a variable resistor VR12 for controlling brightness; a bias/gain control section 10 for controlling bias and gain; a microcomputer 11 for outputting, in the I²C manner, data DATA for the contrast, brightness, bias and/or gain control signals according to output signals of the variable resistors VR11 and VR12 and/or the bias/gain control section 10, and for outputting a clock signal CLK in synchronization with the data DATA; an I²C data process/PWM signal generation section 12 for generating PWM signals relating to contrast, brightness, bias and gain controls according to the data DATA from the microcomputer 11; rectification sections 13, 14,15, and 16 for generating a gain control signal, a contrast control signal, a brightness control signal and a cutoff voltage signal control signals, respectively, by rectifying; the PWM signals from the I²C data process/PWM signal generation section 12; a preamplifying section 18 for controlling gains of R, G and B color video signals inputted from a computer system 17 according to an output signal of the rectifying section 13, and for controlling and preamplifying contrast according to an output signal of the rectification section 14; a buffer 19 for buffering and amplifying an output signal of the preamplifying section 18; a video output section 20 for amplifying an output signal of the buffer 19, and for outputting the amplified output signal to a cathode ray tube 21; and a cutoff control section 22 for setting a cutoff voltage according to the cutoff voltage output signal of the rectification section 16, and for generating bias voltage(s) according to the output signal of the rectification section 15 based on the cutoff voltage.

Figure 3:
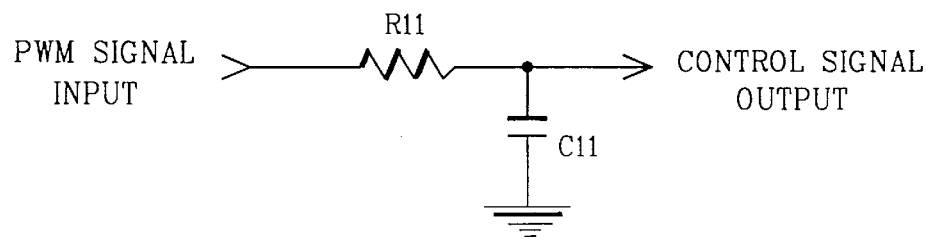
FIG. 3 is a view showing the rectification section of FIG. 2 in detail.

FIG. 3 is a view showing the structure of rectification sections 13, 14, 15, and 16 of FIG. 2 in detail. As shown in FIG. 3, each of the rectification sections 13, 14, 15, and 16 has a low pass filter formed by resistor R11 and capacitor C11 to rectify the PWM signal outputted from the I²C data process/PWM signal generation section 12.

The video control circuit having the above construction according to the embodiment of the present invention provides the bias/gain control section 10 for control of biases and gains of R, G, and B color video signals; provides the variable resistor VR11 for control of contrast in the case of controlling contrast of a video display which is displayed on the screen of the cathode ray tube 21; and provides the variable resistor VR12 for control of brightness in the case of controlling brightness of a video display.

A worker controls the bias/gain control section 10 using a jig during the production stage and a control stage. The bias/gain control section 10 outputs bias and/or gain control signal(s) according to the worker's control.

Further, a worker controls the variable resistors VR11 and VR12 by exposing their control knobs outwardly, and a user thereby control the variable resistors VR11 and VR12 in accordance with his preference. The variable resistors VR11 and VR12 divide the power supply voltage Vcc according to the worker's and user's controls, and output a contrast control signal and a brightness control signal, respectively.

The bias and/or gain control signal, the contrast control signal and the brightness control signal outputted from the variable resistors VR11 and VR12, respectively, are inputted to the microcomputer 11. The microcomputer 11 determines the control of bias, gain, contrast and/or brightness, and outputs the data DATA in the I²C manner according to the determined bias, gain, contrast and/or brightness controls, while outputting a clock signal in synchronization with the data DATA.

The data DATA outputted from the microcomputer 11 is provided as an input to, and is analyzed by, the I²C data process/PWM signal generation section 12 in synchronization with the clock signal CLK so as to determine the control of bias, gain, contrast and/or brightness, and the corresponding outputs. The I²C data process/PWM signal generation section 12 generates a PWM signal according to the determined bias, gain, contrast and/or brightness controls.

The PWM signal of the gain controls for the R, G, and B color video signals outputted from the I²C data process/PWM signal generation section 12 is provided as an input to the rectification section 13 so as to be smoothed and low-pass filtered by the resistor R11 and the capacitor C11 to a direct current level for input to the preamplifying section 18. The PWM signal for brightness control is converted to another direct current level, in rectification section is and is inputted to the cutoff control section 22. Further, the preamplifying section 18 controls the white balance by varying the gains of the R, G, and B color video signals inputted from the computer system 17 according to an output signal of the rectification section 13, and controls and preamplifies the contrast according to the output signal of the rectification section 14.

The gain and/or contrast-controlled R, G, and B color video signals from the preamplifying section 18 pass through a buffer 19, and are provided to the cathode ray tube 21 after being amplified in a video output section 20, thereby displaying an image. Further, the rectification section 15 rectifies a PWM signal for brightness from the I²C data precess/PWM signal generation section 12 to output a brightness control signal. The rectification section 16 rectifies the PWM signal for bias from the I²C data process/PWM signal generation section 12 so as to output a cutoff voltage. The brightness control signal and the cutoff voltage from the rectification sections 15 and 16, respectively, are inputted to the cutoff control section 22. The cutoff control section 22 outputs bias voltages for the R, G, and B color video signals based on the brightness control signal input from the rectification section 15 and the cutoff voltage input from the rectification section 16. The bias voltages from the cutoff control section 22 control the R, G, and B color video signals which the video output section 20 outputs to the cathode ray tube 21.

As described in detail above, in the present invention, the microcomputer outputs control signals for gain, contrast and bias in the I²C manner. Since the present invention rectifies and controls the PWM signal converted from the gain, brightness, contrast and bias control signals in the I²C manner, only two output terminals of the microcomputer are employed. Therefore, the present invention enables a cheap microcomputer to be employed. Using the cheap microcomputer, the production cost of a product can decrease. Further, using only two output terminals makes the structure of the circuit simpler and manufacture of the printed circuit board easier.

What is claimed is:

1. A video control circuit for a video display device, comprising:

a preamplifing section for controlling and preamplifying gains and contrast of color video signals from a computer system;

a video output section for amplifying an output signal of the preamplifying section and outputting the amplified output signal to a cathode ray tube;

a first variable resistor for controlling contrast and providing an output signal;

a second variable resistor for controlling brightness and providing an output signal;

converting means for receiving the output signals from said first and second variable resistors and a bias/gain control input signal, and for converting the received signals in an inter interface control ($I^2C$) manner so as to obtain converted data for controlling contrast, brightness, gain and bias, and so as to provide a clock signal;

$I^2C$ data process and pulse width modulation signal generation means connected to said converting means and responsive to the converted data and the clock signal therefrom for generating pulse width modulated (PWM) signals for controlling contrast, brightness, bias and gain; and rectification means connected to said $I^2C$ data process and pulse width modulation signal generation means for generating a contrast control signal, a brightness control signal, a gain control signal and a cutoff voltage by rectifying the PWM signals generated by said $I^2C$ data process and pulse width modulation signal generation means; and a cutoff control section connected to said rectification means for receiving said brightness control signal and said cutoff voltage, and responsive thereto for generating a bias voltage and applying said bias voltage to said video display device.

2. The video control circuit as claimed in claim 1, wherein said rectification means comprises a low pass filter.

3. The video control circuit as claimed in claim 2, wherein said rectification means comprises a resistor for input of said pulse width modulated signal, and a capacitor connected to said resistor for smoothing said pulse width modulated signal.

4. The video control circuit as claimed in claim 1, wherein said rectification means comprises a resistor for input of the pulse width modulated signal, and a capacitor connected to said resistor for smoothing said pulse width modulated signal.

5. The video control circuit as claimed in claim 1, wherein said converting means comprises a microcomputer connected to said $I^2C$ data process and pulse width modulation signal generation means and to said first and second variable resistors.

6. The video control circuit as claimed in claim 1, wherein said rectification means includes a rectification section connected to said $I^2C$ data process and pulse width modulation signal generation means for generating said cutoff voltage, and providing said cutoff voltage to said cutoff control section.

7. A video control circuit for a video display system having a preamplifying section connected to a display device, said circuit comprising:

converting means for converting input signals in an inter interface control ($I^2C$) manner so as to obtain converted data and a clock output; and signal generation means connected to said converting means for receiving said converted data and said clock output, and responsive thereto for generating a gain control signal and a contrast control signal which are provided to said preamplifying section, and at least one bias voltage provided to said display device;

wherein said signal generation means comprises a pulse width modulation (PWM) signal generation section for generating a PWM signal output including a bias output, and a first rectification section for receiving and rectifying said bias output to obtain a cutoff voltage;

wherein said PWM signal output of said PWM signal generation section includes a brightness output, and said signal generation means further comprises a second rectification section connected to said PWM signal generation section for receiving and rectifying said brightness output to obtain a brightness control signal; and wherein said signal generation means further comprises a cutoff control section connected to said first and second rectification sections for receiving said cutoff voltage and said brightness control signal, and responsive to said cutoff voltage and said brightness control signal for generating said at least one bias voltage.

8. The video control circuit as claimed in claim 7, wherein said PWM signal output of said PWM signal generation section includes a gain control output, and said signal generation means further comprises a third rectification section connected to said PWM signal generation section for receiving and rectifying said gain control output to obtain said gain control signal.

9. The video control circuit as claimed in claim 8, wherein said PWM signal output of said PWM signal generation section includes a contrast control output, and said signal generation means further comprises a fourth rectification section connected to said PWM signal generation section for receiving and rectifying said contrast control output to obtain said contrast control signal.

10. The video control circuit as claimed in claim 7, wherein said PWM signal output of said PWM signal generation section includes a contrast control output, and said signal generation means further comprises a third rectification section connected to said PWM signal generation section for receiving and rectifying said contrast control output to obtain said contrast control signal.

11. The video control circuit as claimed in claim 7, further comprising a first variable resistor connected to said converting means and to a supply voltage for generating a contrast control input and for providing said contrast control input to said converting means.

12. The video control circuit as claimed in claim 11, further comprising a second variable resistor connected to said converting means and to a supply voltage for generating a brightness control input, and for providing said brightness control input to said converting means.

13. The video control circuit as claimed in claim 7, further comprising a variable resistor connected to said converting means and to a supply voltage for generating said brightness control input, and for providing said brightness control input to said converting means.

14. The video control circuit as claimed in claim 7, wherein each of said first and second rectification sections comprises an input resistor connected to said PWM signal generation section for receiving one of said bias output and said brightness output, and a capacitor connected to said input resistor for smoothing said one of said bias output and said brightness output.

* * * * *